(12) United States Patent
Elfström et al.

(10) Patent No.: US 11,337,089 B2
(45) Date of Patent: May 17, 2022

(54) METHOD AND NODES FOR TESTING A NODE

(71) Applicant: Telefonaktiebolaget LM Ericsson (PUBL), Stockholm (SE)

(72) Inventors: Torbjörn Elfström, Fjärås (SE); Joakim Axmon, Limhamn (SE); Thomas Chapman, Solna (SE); Esther Sienkiewicz, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/752,703

(22) PCT Filed: Oct. 26, 2017

(86) PCT No.: PCT/EP2017/077452
§ 371 (c)(1),
(2) Date: Feb. 14, 2018

(87) PCT Pub. No.: WO2019/081025
PCT Pub. Date: May 2, 2019

(65) Prior Publication Data
US 2019/0132754 A1    May 2, 2019

(51) Int. Cl.
*H04W 24/08* (2009.01)
*H04B 17/24* (2015.01)
(Continued)

(52) U.S. Cl.
CPC ............ *H04W 24/08* (2013.01); *H04B 17/15* (2015.01); *H04B 17/18* (2015.01); *H04B 17/24* (2015.01); *H04B 17/29* (2015.01)

(58) Field of Classification Search
CPC combination set(s) only.
See application file for complete search history.

(56) References Cited

U.S. PATENT DOCUMENTS

| | | | | |
|---|---|---|---|---|
| 6,052,362 A | * | 4/2000 | Somer | H04L 43/50 370/246 |
| 6,122,505 A | * | 9/2000 | Genell | H04W 24/00 455/423 |

(Continued)

FOREIGN PATENT DOCUMENTS

JP    2002084237 A    3/2002

OTHER PUBLICATIONS

International Search Report and Written Opinion issued in International Application No. PCT/EP2017/077452, dated Jul. 11, 2018, 15 pages.

*Primary Examiner* — Zhiyu Lu
(74) *Attorney, Agent, or Firm* — Rothwell, Figg, Ernst & Manbeck, P.C.

(57) ABSTRACT

The embodiments herein relate to a method performed by a first node (101) for enabling testing of at least a part (105, 108) of the first node (101) in a deployed network. The first node (101) determines that at least a part (105, 108) of the first node (101) should be tested, and determines a direction in which to transmit or receive a test signal (200) to or from a second node (103). The first node (101) transmits the test signal (200) OTA in the determined direction to the second node (103) if a transmitter of the first node (101) should be tested. The first node (101) receives the test signal (200) OTA in the determined direction from the second node (103) if a receiver of the first node (101) should be tested.

20 Claims, 10 Drawing Sheets

(51) Int. Cl.
  *H04B 17/18*  (2015.01)
  *H04B 17/15*  (2015.01)
  *H04B 17/29*  (2015.01)

(56) References Cited

U.S. PATENT DOCUMENTS

| | | | | |
|---|---|---|---|---|
| 6,308,065 | B1* | 10/2001 | Molinari | H04W 24/00 455/423 |
| 6,571,082 | B1* | 5/2003 | Rahman | H04B 17/0087 342/451 |
| 7,260,079 | B1* | 8/2007 | Chapman | H04W 28/20 370/252 |
| 7,689,213 | B2* | 3/2010 | Olgaard | H04B 17/3911 455/425 |
| 8,811,194 | B2* | 8/2014 | Olgaard | H04L 43/50 370/249 |
| 8,908,616 | B2* | 12/2014 | Caillerie | H04B 7/0639 370/329 |
| 9,794,009 | B1* | 10/2017 | Olgaard | H04B 7/0617 |
| 2002/0071406 | A1* | 6/2002 | Bursztejn | H01Q 3/267 370/334 |
| 2005/0086021 | A1* | 4/2005 | Khandros | G01R 31/3025 702/121 |
| 2005/0107080 | A1* | 5/2005 | Hasegawa | H04W 24/00 455/423 |
| 2005/0250543 | A1* | 11/2005 | Thermond | H04W 88/08 455/562.1 |
| 2008/0205500 | A1* | 8/2008 | C-Liu | H04W 24/08 375/224 |
| 2008/0242316 | A1* | 10/2008 | Wang | G01S 5/14 455/456.2 |
| 2008/0285637 | A1* | 11/2008 | Liu | H04B 17/20 375/224 |
| 2008/0311871 | A1* | 12/2008 | Qi | H04B 17/29 455/226.2 |
| 2009/0003272 | A1* | 1/2009 | Payne | H04W 24/08 370/329 |
| 2010/0210219 | A1* | 8/2010 | Stirling-Gallacher | H04B 7/0695 455/67.11 |
| 2010/0298015 | A1* | 11/2010 | Medbo | H04B 7/0617 455/501 |
| 2013/0003687 | A1* | 1/2013 | Woodley | H04L 5/0091 370/329 |
| 2013/0107737 | A1* | 5/2013 | Lee | H04W 36/30 370/252 |
| 2013/0225229 | A1* | 8/2013 | Al-Shalash | H04W 24/10 455/524 |
| 2014/0036715 | A1 | 2/2014 | Chung et al. | |
| 2014/0038630 | A1* | 2/2014 | Kallin | H04W 24/08 455/452.1 |
| 2014/0094180 | A1* | 4/2014 | Zhou | H04W 76/14 455/445 |
| 2014/0269340 | A1* | 9/2014 | Sjolinder | H04W 24/06 370/241 |
| 2014/0369394 | A1* | 12/2014 | Ruuska | H04W 16/28 375/224 |
| 2014/0370884 | A1* | 12/2014 | Kummetz | H04W 24/10 455/423 |
| 2015/0036729 | A1* | 2/2015 | Olgaard | H04B 17/29 375/224 |
| 2015/0105072 | A1* | 4/2015 | Zhu | H04W 24/02 455/434 |
| 2015/0230263 | A1* | 8/2015 | Roy | H04W 64/003 455/452.2 |
| 2016/0050573 | A1* | 2/2016 | Merkel | H04W 76/14 455/67.11 |
| 2016/0134383 | A1* | 5/2016 | Banasky, Jr. | H04B 1/40 455/67.14 |
| 2016/0226601 | A1* | 8/2016 | Hu | H04B 1/40 |
| 2016/0233970 | A1* | 8/2016 | Reed | H04B 17/12 |
| 2016/0352611 | A1* | 12/2016 | Olgaard | H04L 1/203 |
| 2017/0127294 | A1* | 5/2017 | Ui | H04B 7/0695 |
| 2017/0170916 | A1* | 6/2017 | Olgaard | H04B 17/29 |
| 2017/0303138 | A1* | 10/2017 | Barmettler | H04W 72/0453 |
| 2018/0027434 | A1* | 1/2018 | Foegelle | H04B 7/0617 455/67.13 |
| 2018/0115065 | A1* | 4/2018 | Valdes Garcia | H04B 1/1081 |
| 2018/0279142 | A1* | 9/2018 | Mustajarvi | H04L 43/0888 |
| 2019/0132754 | A1* | 5/2019 | Elfstrom | H04B 17/18 |

* cited by examiner

METHOD AND NODES FOR TESTING A NODE

CROSS REFERENCE TO RELATED APPLICATION(S)

This application is a 35 U.S.C. § 371 National Stage of International Patent Application No. PCT/EP2017/077452, filed Oct. 26, 2017, designating the United States, the disclosure of which is incorporated by reference.

TECHNICAL FIELD

Embodiments herein relate generally to a first node, a method performed by the first node, a second node and a method performed by the second node. More particularly, the embodiments herein relate to enabling testing of at least a part of the first node in a deployed network.

BACKGROUND

Some countries have mandatory requirements for regulatory inspection on Radio Base Stations (RBS, BS) covering larger geographical areas. During these inspection tests, the BS shall be inspected during operational mode (i.e. traffic not to be turned off in the cell served by the BS). The radio base station must remain transmitting during the inspection. Parameters measured during inspection of the base station are mainly: frequency error, occupied bandwidth, output power, and emissions. Other parameters could also be measured if required. Note that the terms radio base station and base station are used interchangeably herein.

The current method is to use a conducted test where the operator connects to a physical connector (e.g. Sub-Miniature Push-On (SMP), Sub-Miniature version A (SMA), Sub-Miniature version B (SMB), Threaded Neill-Concelman (TNC), 7/16 or N type of connector) per branch on the radio base station by means of a feeder cable from the Remote Radio Unit (RRU) to the base of the tower (i.e. the tower on which the base station is mounted) where measurements can be made. The RRU could sometimes also be mounted in the close vicinity of the antenna (i.e. the antenna of the base station). Experience from previous products show that the accuracy for the internal monitor port with the general stated coupling factor value is not sufficient in accuracy. A monitor port may also be referred to as a measurement port. The internal monitor port is the Radio Frequency (RF) monitor port on the transceiver (e.g. the RRU).

For upcoming base stations products (also referred to as Active Antenna Systems (AAS) BS products) with a number of transmitters (TX) upwards of 64 or more, a separate TX system with monitor ports for each TX would be difficult from a building practice perspective and also involves extra added costs. Also the logistical aspect would be complex for systems with many monitor ports. An alternative solution may be needed since added monitor ports may cause added losses or reflections in the RF chain which may not have been considered during the initial design without such ports, also the available space is a limiting factor to consider for systems operating at millimetre wave frequencies. The RF chain is the transmission path inside the base station. Adding monitor ports adds complexity and losses which will affect the power radiated by the base station and the link between the base station and the User Equipment (UE). Additionally, an extra set of production measurements would be needed to ensure the conducted tests (utilizing monitor ports) produce an equivalent result as the Over The Air (OTA) measurements.

Looking forward towards the millimetre wave base station products, it becomes even more unlikely that monitor ports would be feasible as part of the overall design. RF connectors at base station monitoring ports for high frequencies are in general fragile and their performance degrades after usage. Frequencies above 10 GHz are often referred to as high with respect to RF connectors. For such frequencies, the connectors can become infeasible to build.

Hence, in order to alleviate these problems, nodes and methods that allow inspection of node compliance without disturbing the operation, and without using measurement ports, are needed.

Therefore, there is a need to at least mitigate or solve this issue.

SUMMARY

An objective of embodiments herein is therefore to obviate at least one of the above disadvantages and to provide an improved testing of at least part of a first node.

According to a first aspect, the object is achieved by a method performed by a first node for enabling testing of at least a part of the first node in a deployed network. The first node determines that at least a part of the first node should be tested. The first node determines a direction in which to transmit or receive a test signal to or from a second node. The first node transmits the test signal OTA in the determined direction to the second node if a transmitter of the first node should be tested, and receives the test signal OTA in the determined direction from the second node if a receiver of the first node should be tested.

According to a second aspect, the object is achieved by a method performed by a second node for enabling testing of at least a part of a first node in a deployed network. The second node determines that at least a part of the first node should be tested. The second node determines a direction in which to transmit or receive a test signal to or from the first node. The second node receives the test signal OTA in the direction from the first node if a transmitter of the first node is the part that should be tested, and transmits the test signal OTA in the direction to the first node if a receiver of the first node is the part should be tested.

According to a third aspect, the object is achieved by a first node for enabling testing of at least a part of the first node in a deployed network. The first node is adapted to determine that at least a part of the first node should be tested. The first node is adapted to determine a direction in which to transmit or receive a test signal to or from a second node. The first node is adapted to transmit the test signal OTA in the determined direction to the second node if a transmitter of the first node should be tested, and to receive the test signal OTA in the determined direction from the second node if a receiver of the first node should be tested.

According to a fourth aspect, the object is achieved by a second node for enabling testing of at least a part of a first node in a deployed network. The second node is adapted to determine that at least a part of the first node should be tested. The second node is adapted to determine a direction in which to transmit or receive a test signal to or from the first node. The second node is adapted to receive the test signal OTA in the direction from the first node if a transmitter of the first node is the part that should be tested, and to transmit the test signal OTA in the direction to the first node if a receiver of the first node is the part should be tested.

Thanks to the transmitting or receiving of the test signal OTA in the deployed network, improved testing of at least part of a first node is provided.

Embodiments herein afford many advantages, of which a non-exhaustive list of examples follows:

The embodiments herein provide an advantage of enabling compliance verification of transmitting nodes without the usage of physical monitor ports.

Since access to physical connectors is no longer needed, another advantage of the embodiments herein is that mast climbing and multi-port measurement is no longer needed. Consequently, the node operation cost can be reduced.

Also, access to the site to access the base station mounted on ground can be difficult. The embodiments herein enables easy testing because it is not necessary to access the site facilities at all when the test signal is transmitted OTA.

The time to evaluate RF characteristics is reduced with the embodiments herein since access to the site electronics is not required. Furthermore, the embodiments herein allow fast evaluation of multiple sites, since the measurement device (represented by the second node) can be moved freely through air between base station sites.

The OTA radiated characteristics give a better knowledge of the real performance of the part of the first node that is tested than the characteristics at individual ports. This is of great interest for the first node when in the form of a base station using advanced beam-forming schemes.

A further advantage of the embodiments herein is that there is no need to incur cost and performance losses from building a connector. In fact, building connectors is not even possible for mm-wave frequencies or large number of transmitters.

The embodiments herein enable testing for frequencies where connectors are infeasible. They also enable more frequent inspections where needed.

The embodiments herein provide the advantage of offering some additional flexibility to locate e.g. the spatial pattern of emissions or other problems, which is not possible with regular connector testing.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
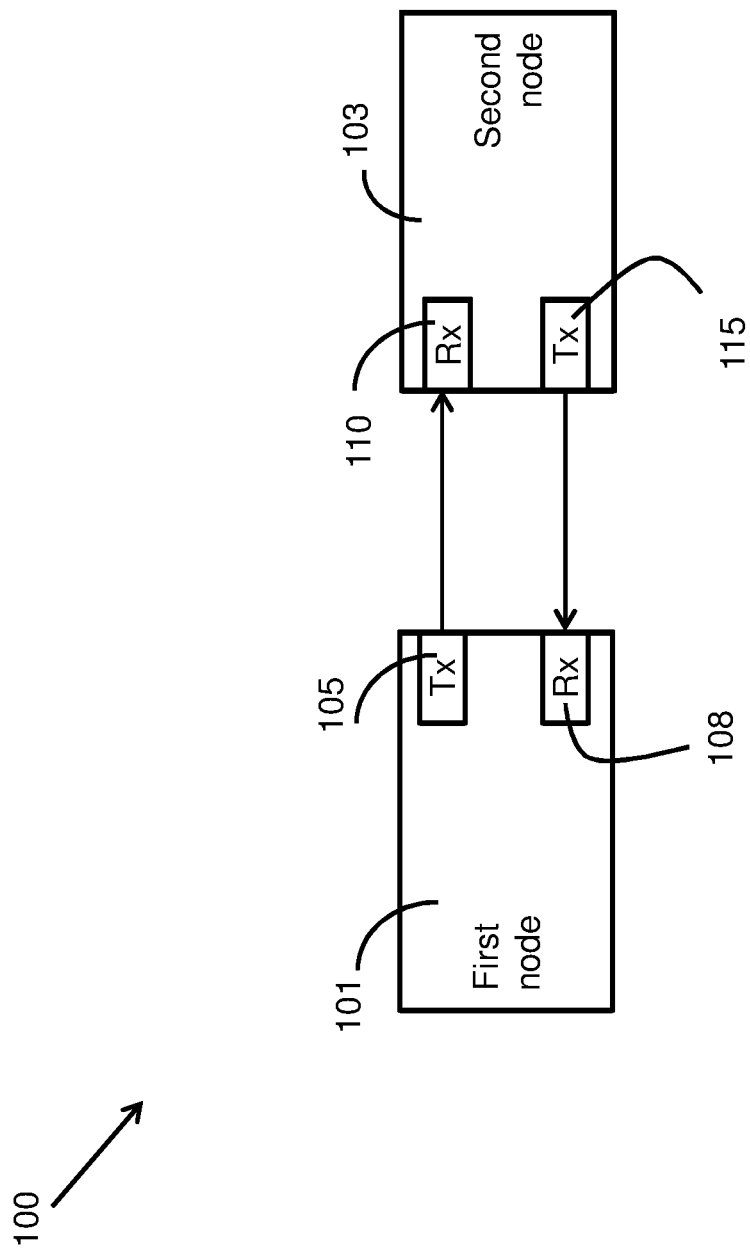
FIG. 1 is a schematic drawing illustrating a communication system.

FIG. 1 depicts a communications system 100 in which embodiments herein may be implemented. The communications network 100 may in some embodiments apply to one or more radio access technologies such as for example Long Term Evolution (LTE), LTE Advanced, Wideband Code Division Multiple Access (WCDMA), Global System for Mobile Communications (GSM), or any other Third Generation Partnership Project (3GPP) radio access technology, or other radio access technologies such as e.g. Wireless Local Area Network (WLAN). The communication system 100 may also be referred to as a deployed network. At a deployed network, the nodes are in operation. A deployed network is the opposite of a test network or test site. A deployed network is a network in operation carrying traffic. The deployed network may be described as comprising different types of base station types (ranging from wide area base stations, medium range and local area base stations). Typically, the deployed network is geographically built in a hexagon grid, with exceptions to compensate for outage due to geological conditions and buildings. Due to regulation is some regions, the output power of a base station needs to be monitored according to a pre-defined schedule.

The communication system 100 comprises a first node 101 and a second node 103. The first and second nodes 101, 103 are adapted to communicate with each other. The first node 101 comprises a TX 105 and a receiver (RX) 108. The TX 105 comprised in the first node 101 may be referred to as a first TX and the RX 108 comprised in the first node 101 may be referred to as a first RX. The second node 103 comprises a RX 110 and a TX 115. The TX 115 comprised in the second node 103 may be referred to as a second TX and the RX 110 comprised in the second node 103 may be referred to as a second RX. Each respective TX 105, 115 may be in the form of at least one TX antenna, and each respective RX 108, 115 may be in the form of at least one RX antenna. For example, the first node 101 may transmit a signal from the TX 105, and the second node 103 receives this signal at its RX 110. In another example, the second node 103 may transmit a signal from the TX 115, and the first node 101 receives this signal at its RX 108. The first node 101 may be a base station and the second node 103 may be a UE, or the first node 101 may be a UE and the second node may be a base station. The first node 101 may also be referred to as a network node, a tested node, or a node to be tested. The second node 103 may also be referred to as a test UE, a testing node, measurement device, a testing object, etc. Table 1 below illustrates some examples of the first and second nodes 101, 103:

TABLE 1

| First node 101 | Second node 103 |
|---|---|
| UE | Base station |
| Base station | UE |

The base station may be a base station such as a NodeB, an evolved Node B (eNodeB, eNB), gNB, or any other network unit capable to communicate over a radio carrier with the UE.

The UE may be a device by which a subscriber may access services offered by an operator's network and services outside the operator's network to which the operator's radio access network and core network provide access, e.g. access to the Internet. The UE may be any device, mobile or stationary, enabled to communicate in the communications system 100, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE may be portable, pocket storable, hand held, computer comprised, or vehicle mounted devices, enabled to communicate voice and/or data, via the radio access network, with another entity, such as another UE or a server.

In an example where the second node 103 is referred to as a UE, the UE may not necessarily be a normal UE, but it may be a special test type of UE. It may also not implement all functionality of a normal UE, but may have some added test functionality. In other words, the UE may not be a full UE, but it may implement only a part of the full communications stack for a normal UE. In addition, some additional test functionality may be implemented in the UE. Such additional test functionality may not be provided by a normal UE.

In one example, when the second node 103 is a UE, the second node 103 may be for example located in an Unmanned Aerial Vehicle (UAV), a drone, at a tower, at a roof of a building etc. Consequently, the second node 103 may be located at a height over the ground and over the first node 101. An advantage of locating the second node 103 in a UAV or a drone is that it is easy to perform the testing of the first node 101 since the UAV or drone can be released and moved "anywhere" and there is no need for any permanent installation on ground of the second node 103. In addition, a UAV or a drone can be positioned so that the second node 103 has a line of sight to the first node 101 preferably without any obstructions which may deteriorate the test signal on its way to the second node 103.

The first and second nodes 101, 103 are located in a deployed network and the methods described herein are performed during operation, during live operation. In other words, the first and second nodes 101, 103 are not in any test mode or at a test site.

It should be noted that the communication links in the communications system 100 may be of any suitable wireless link. The link may use any suitable protocol depending on type and level of layer (e.g. as indicated by the Open Systems Interconnection model (OSI) model) as understood by the person skilled in the art.

Figure 2B:
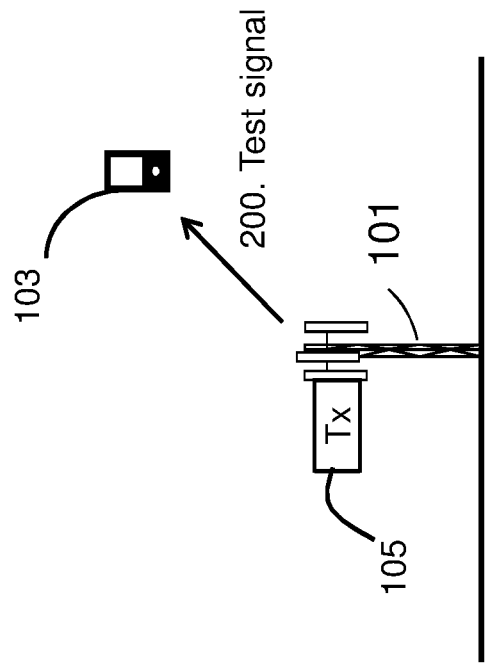
FIG. 2b is a schematic drawing illustrating a communication system
Figure 2A:
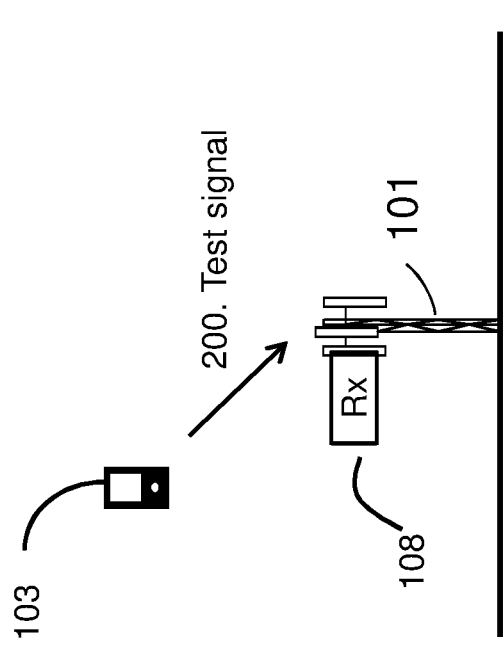
FIG. 2a is a schematic drawing illustrating a communication system.

FIG. 2a and FIG. 2b are two schematic drawings illustrating examples of the communication system, i.e. one of the examples provided in Table 1 above.

In FIG. 2a, the first node 101 is exemplified with a base station and the second node 103 is exemplified with a UE. The RX 108 of the first node 101 is the part which is to be tested in this example. The second node 103 is adapted to send a test signal 200 (e.g. from its TX 115, not illustrated in FIG. 2a) which is received by the first node 101 at its RX 108.

In FIG. 2b, the first node 101 is exemplified with a base station and the second node 103 is exemplified with a UE. The TX 105 of the first node 101 is the part which is to be tested in this example. The first node 101 is adapted to send a test signal 200 from its TX 105, and the test signal 200 is received by the second node 103 (e.g. at its RX 110, not illustrated in FIG. 2b).

Table 2 illustrates some examples of the first and second nodes 101, 103, the part of the node to be tested and the part which sends the test signal 200:

TABLE 2

| First node 101 | Second node 103 | Part to be tested | Part which sends test signal 200 |
| --- | --- | --- | --- |
| Base station | UE | RX 108 of base station | TX 115 of UE |
| Base station | UE | TX 105 of base station | TX 105 of base station |
| UE | Base station | RX 108 of UE | TX 115 of base station |
| UE | Base station | TX 105 of UE | TX 105 of UE |

Figure 3:
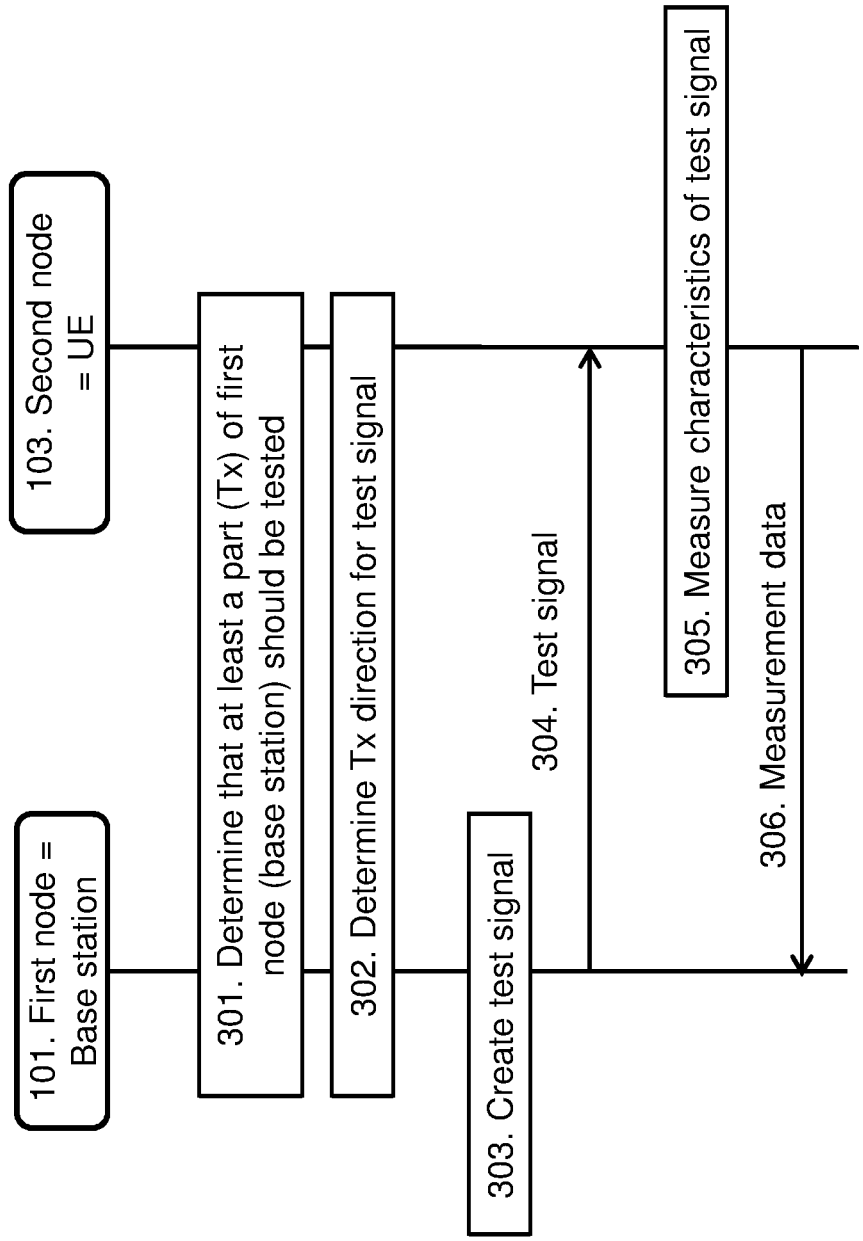
FIG. 3 is a signaling diagram illustrating a method.

The method for enabling testing of at least a part 105, 108 of the first node 101 in a deployed network, according to some examples will now be described with reference to the signalling diagram depicted in FIG. 3. In FIG. 3, the first node 101 is exemplified with a base station and the second node 103 is exemplified with a UE. A TX 105 of the first node 101 (i.e. base station) is the part to be tested in this example. The method comprises at least one of the following steps, which steps may as well be carried out in another suitable order than described below:

Step 301

It is determined that at least a part of first node 101 should be tested. As mentioned above, in the example in FIG. 3, it is the TX 105 of the base station that is tested. It may be the first node 101 that takes the decision, or it may be the second node 103 that takes the decision, it may be both the first and second nodes 101, 103 that takes the decision, or a third node (not illustrated) may take the decision and inform the first and second nodes 101, 103 about the decision.

For example, the first node 101 may take the decision, then sends decision information to the second node 103. Consequently, the second node 103 turns on a test function. The decision information may be sent from the first node 101 via a third node (e.g. a controller) to the second node 103.

In another example, the second node 103 may take the decision and then sends decision information to the first node 101. In other words, the second node 103 may send an instruction to the first node 101 to turn on a test function. This may also be described as the second node 103 may send test information to the first node 101 indicating that the second node 103 it is a testing node which will test at least part of the first node 101. The decision information may be sent from the second node 103 via a third node (e.g. a controller) to the first node 101.

In another example, a third node (e.g. controller) takes the decision and then sends decision information to the first node 101 or the second node 103 or to both the first and second nodes 101, 103.

Thus, the first node 101, or the second node 103 or both nodes 101, 103 may have knowledge of the decision to test at least a part of the first node 101.

For example, the decision may be taken when a request on emulating a fully loaded cell is received by the first node 101 (transmitted from the second node 103). Emulating a fully loaded cell may be the same as performing a test. The cell may be the cell which the first node 101 serves. The request may comprise a timer which indicates the duration of the test, i.e. a time when the transmission of the test signal 200 should stop.

Step 302

Step 302 may be triggered by step 301. The TX direction for test signal 200 is determined, i.e. the direction in which the TX 105 of the first node 101 should send the test signal 200 to be received by the second node 103. This may be determined by the first node 101, or the second node 103 or both the first and second nodes 101, 103.

Since the test signal 200 may be transmitted from the first node 101 to the second node 103, it may need to be some distance between the nodes 101, 103. The distance may be a longitudinal distance and/or a lateral distance (e.g. there may be a height difference between the first and second nodes 101, 103).

For example, the first node 101 may calculate the direction itself and possibly transmit information about the calculated direction to the second node 103. In another example, the second node 103 calculates the direction and transmits information about the calculated direction to the first node 101. In further example, both the first and second nodes 101, 103 calculate the direction.

In another example, the second node 103 calculates the direction and transmits the direction information to a controller, to a memory in the cloud etc. The controller/memory then passes the information to the first node 101.

In a further example, the controller may determine the direction and inform both the first and second nodes 101, 103 about the direction. In such example, at least one of the first and second nodes 101, 103 may move to another location in order for the testing to be performed in order to be able to transmit or receive in the determined direction.

The first node 10 may interpret the direction in relation to the second node 103, and the second node 103 may interpret the direction in relation to the first node 101.

Step 303

The first node 101 creates a test signal 200. This step 303 may be performed when at least step 302 has been performed, or when steps 301 and 302 both have been performed.

Step 304

The first node 101 transmits the created test signal 200 to the second node 103. The second node 103 receives the test signal 200 from the first node 101. Using other words, the TX 105 of the first node 101 transmits the test signal 200 to the RX 110 of the second node 103. The test signal 200 may be transmitted until a timer expires.

Step 305

The second node 103 measures characteristics of the test signal 200. The result of the measurements may be in the form of measurement data. The measured characteristics are associated with the test signal 200 transmitted by the TX 105 of the first node 105.

Step 306

The second node 103 sends measurement data to the first node 101. The first node 101 receives the measurement data from the second node 103. The measurement data is the outcome of the measurements performed in step 305 and may be described as characteristics of the test signal 200 when received by the RX 110 of the second node 103.

The first node 101 may analyze the measurement data. The analysis may be done by for example comparing characteristics of the test signal 200 when transmitted from the TX 105 with the characteristics of the test signal 200 when received by the RX 110. The compared characteristics may have the same values or they may have different values. Some tolerance related to the values when they are compared may be acceptable.

Figure 4:
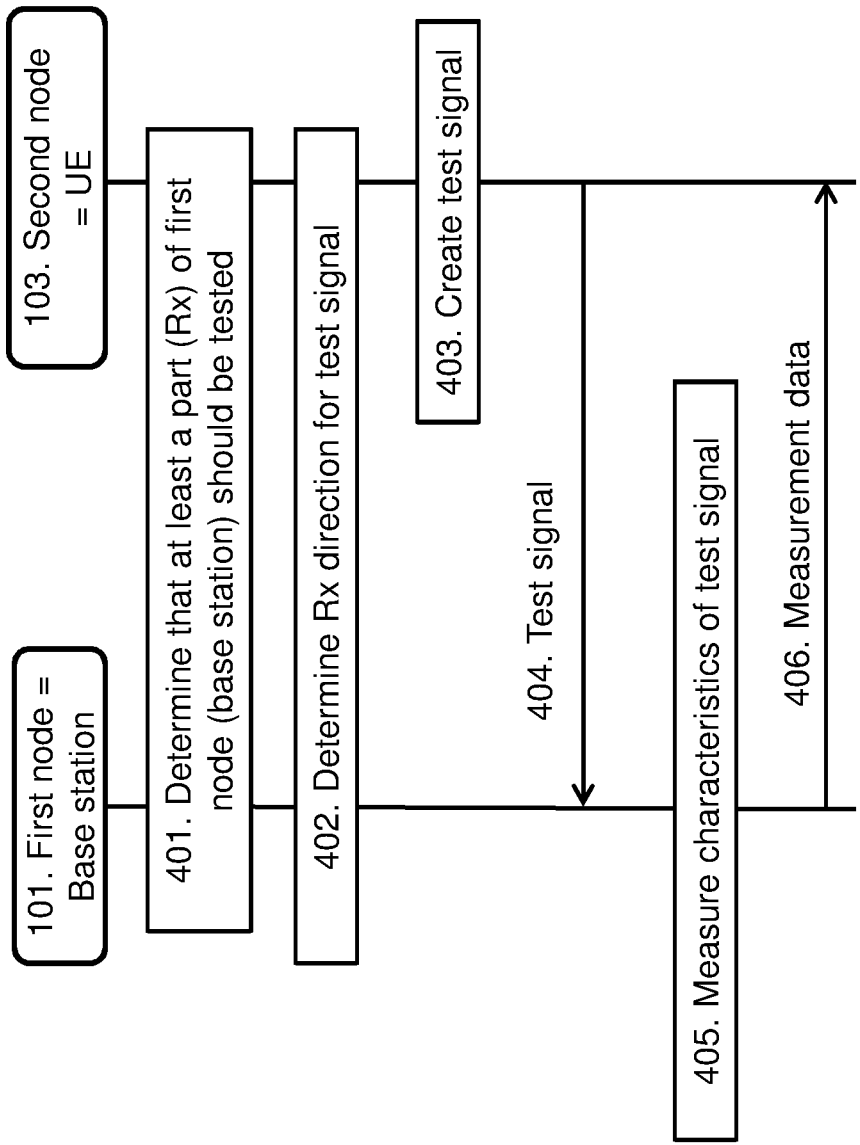
FIG. 4 is a signaling diagram illustrating a method.

The method for enabling testing of at least a part 105, 108 of the first node 101 in a deployed network, according to some examples will now be described with reference to the signalling diagram depicted in FIG. 4. In FIG. 4, the first node 101 is exemplified by a base station and the second node 103 is exemplified by a UE, which is the same as in FIG. 3. A RX 108 of the first node 101 (i.e. base station) is the part to be tested in this example, which is different from FIG. 3 where the TX 105 of the first node 101 was tested. The method in FIG. 4 comprises at least one of the following steps, which steps may as well be carried out in another suitable order than described below:

Step 401

This step corresponds to step 301 in FIG. 3. It is determined that at least a part of first node 101 should be tested. As mentioned above, in the example in FIG. 4, it is the RX 108 of the base station that is tested. It may be the first node 101 that takes the decision, or it may be the second node 103 that takes the decision, or it may be both the first and second nodes 101, 103 that take the decision.

The step may be in the form of that the second node 103 sends test information to the first node 101 indicating that the second node 103 it is a testing node which will test at least part of the first node 101.

It is determined that at least a part of first node 101 should be tested. As mentioned above, it is the RX 108 of the base station that is tested. It may be the first node 101 that takes the decision, or it may be the second node 103 that takes the decision, or it may be both the first and second nodes 101, 103 that takes the decision.

For example, the first node 101 may take the decision, then sends decision information to the second node 103. Consequently, the second node 103 turns on a test function. The decision information may be sent from the first node 101 via a third node (e.g. a controller) to the second node 103.

In another example, the second node 103 may take the decision and then sends decision information to the first node 101. In other words, the second node 103 may send an instruction to the first node 101 to turn on a test function in the first node 101. This may also be described as the second node 103 may send test information to the first node 101 indicating that the second node 103 it is a testing node which will test at least part of the first node 101. The decision information may be sent from the second node 103 via a third node (e.g. a controller) to the first node 101.

In another example, a third node (e.g. controller) takes the decision and then sends decision information to the first node 101 or the second node 103 or to both the first and second nodes 101, 103.

Thus, the first node 101, or the second node 103 or both nodes 101, 103 may have knowledge of the decision to test at least a part of the first node 101.

For example, the decision may be taken when a request on emulating a fully loaded cell is received by the first node 101 (transmitted from the second node 103). Emulating a fully loaded cell may be the same as performing a test. The cell may be the cell which the first node 101 serves. The request may comprise a timer which indicates the duration of the test, i.e. a time when the transmission of the test signal 200 should stop.

The first node 101 may be instructed to continue operating as a real cell, whilst sending a test signal 200 on some resources (assuming that the first node 101 is already fully loaded with real traffic).

Step 402

Step 402 may be triggered by step 401. The RX direction for test signal 200 is determined, i.e. the direction in which the RX 108 of the first node 101 should receive the test signal 200 to be received from the second node 103. This may be determined by the first node 101, or the second node 103 or both the first and second nodes 101, 103.

Step 403

The second node 103 creates a test signal 200. This step 403 may be performed when at least step 402 has been performed, or when steps 401 and 402 both have been performed.

Step 404

The second node 103 transmits the created test signal 200 to the first node 101. The first node 101 receives the test signal 200 from the second node 103. Using other words, the TX 115 of the second node 103 transmits the test signal 200 to the RX 108 of the first node 101. The test signal 200 may be transmitted until a timer expires.

Step 405

The first node 101 measures characteristics of the test signal 200. The result of the measurements may be in the form of measurement data.

Step 406

The first node 101 may send measurement data to the second node 103. The second node 103 may receive the measurement data from the first node 101. The measurement data is the outcome of the measurements performed in step 405 and may be described as characteristics of the test signal 200 when received by the RX 108 of the first node 101.

The node 103 may analyze the measurement data. The analysis may be done by for example comparing characteristics of the test signal 200 when transmitted from the TX 115 with the characteristics of the test signal 200 when received by the RX 108. The compared characteristics may have the same values or they may have different values. Some tolerance related to the values when they are compared may be acceptable.

Steps 302 and 402 described above may also involve determining the positions of the nodes 101, 103 or sending information about the positions. See also steps 502, 504 and 507 in FIG. 5 and steps 805 and 806 in FIG. 8 described later. In one example, the positions may be already fixed and information needs to be sent so that the test signal 200 is transmitted in the right direction. In another example, the positions may be intended future positions. For example, the second node 103 may be provided with information about the intended first node's relative position, so that the second node 103 can move in order that it achieves the intended position with respect to the first node 101. Thus, the current position and/or intended position may be used to adjust the positioning of at least one of the first node 101 and/or the second node.

Figure 5:
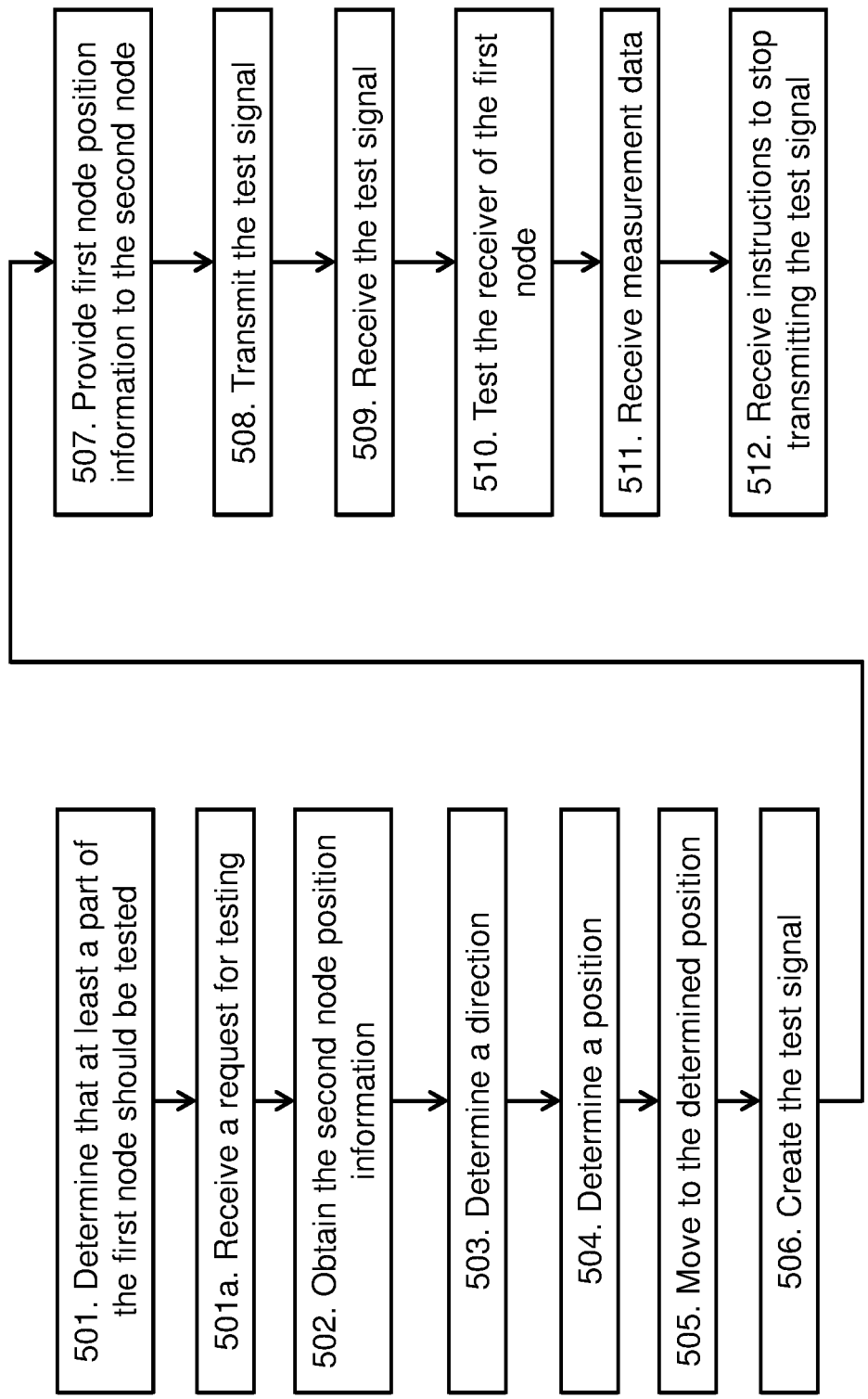
FIG. 5 is a flow chart illustrating a method performed by a first node.

The method described above will now be described seen from the perspective of the first node 101. FIG. 5 is a flowchart describing the present method in the first node 101 for enabling testing of at least a part 105, 108 of the first node 101 in a deployed network. The first node 101 may be a base station and the second node 103 may be UE, and a transmitter 105 of the first node 101 may be the part that should be tested. The first node 101 may be a base station and the second node may be a UE, and a receiver 108 of the first node 101 may be the part that should be tested. The method comprises at least one of the following steps to be performed by the first node 101, which steps may be performed in any suitable order than described below:

Step 501

This step corresponds to step 301 in FIG. 3 and step 401 in FIG. 4. The first node 101 determines that at least a part 105, 108 of the first node 101 should be tested. The part 105, 108 may be the RX 108 and/or the TX 105 of the first node 101. This step may also involve determining which part 105, 108 that should be tested, e.g. the receiver 108 and/or the transmitter 105 of the first node 101.

The decision may be taken for example when receiving a request, as described in step 501*a* below. The decision may be taken when the first node 101 detects that the test is scheduled.

Step 501*a*

This step corresponds to step 301 in FIG. 3 and step 401 in FIG. 4. This step may be seen as a substep of step 501. The first node 101 may receive a request for testing from the second node 103 or from another node. The other node may be for example a controlling node.

Step 502

The first node 101 may obtain second node position information indicating the second node's position with respect to the first node 101. The second node's position 101 may be a current position or a future position. The receiving may be e.g. upon request, on regular basis etc. In other words, the second node 103 may send the second node position information to the first node 101. The second node position information may be obtained by retrieval from a memory, e.g. a memory in a cloud unit or in any other suitable memory which is accessible by the first node 101. The second node position information may be obtained by that the first node 101 calculates the position of the second node 103 using any suitable positioning determining method.

Step 503

This step corresponds to step 302 in FIG. 3 and step 402 in FIG. 4. The first node 101 determines a direction in which to transmit or receive a test signal 200 to or from a second node 103. The direction may be determined based on the second node's position (obtained in step 503). The direction may be determined by receiving direction information indicating the direction from the second node 103.

Step 504

The first node 101 may determine a position in which it should be located when transmitting or receiving the test signal 200.

Step 505

The first node 101 may move to the determined position if it is different from a current position of the first node 101.

Step 506

This step corresponds to step 303 in FIG. 3. The first node 101 may create the test signal 200.

Figure 6:
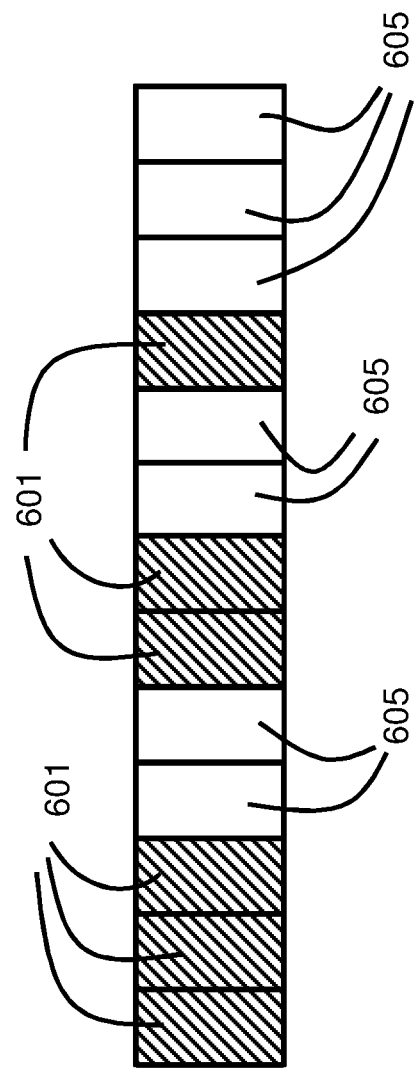
FIG. 6 is a schematic drawing illustrating resource blocks.

The test signal 200 may comprise buffered data and test data in resource blocks. Thus, the test signal 200 comprises a number of resource blocks. This is illustrated in FIG. 6. The buffered data 601 may be scheduled in at least one resource block and the test data 605 is scheduled in at least other resource block which is not used by the buffered data 601. The resource blocks with buffered data 601 are illustrated with shaded boxes in FIG. 6, and the unused resource blocks with test data 605 are illustrated with blank boxes. The resource blocks may be separated with time or frequency, or both time and frequency. If the resource blocks are separated by both time and frequency, the set of resource blocks illustrated in FIG. 6 may be described as a time/ frequency matrix. The buffered data may be described as data waiting to be transmitted to at least one second node 103 which is connected to the first node 101 and which is active in the deployed network. The test data may also be referred to as dummy data or random data.

The creation of the test signal 200 may be done by performing (at the first node 101) at least one of the following steps:

scheduling buffered data in at least some of the resource blocks, the buffered data is to be transmitted to second nodes 103 which are active in the deployed network;

identifying unused resources blocks 605 which are not used by the buffered data; and inserting the test data at the unused resource blocks 605.

Returning to FIG. 5.

Step 507

The first node 101 may provide, to the second node 103, first node position information indicating the first node's position 101 with respect to the second node 103. The first node's position 101 is a current position or a future position.

Step 508

This step corresponds to step 306 in FIG. 3. The first node 101 transmits the test signal 200 OTA in the determined direction to the second node 103 if a transmitter (TX 105) of the first node 101 should be tested. The test signal 200 may be transmitted until a timer expires.

OTA is short for Over The Air and describes transmission and reception of signals using wireless connections, i.e. not using wired connections.

Step 509

This step corresponds to step 404 in FIG. 4. The first node 101 receives the test signal 200 OTA in the determined direction from the second node 103 if a receiver of the first node 101 should be tested.

Step 510

This step corresponds to step 405 in FIG. 4. This step may be performed in addition to step 507 or instead of step 507. Step 506 may be performed before or after step 507 or at the same time as step 507. When the receiver 108 of the first node 101 should be tested, the first node 101 may test the receiver 108 of the first node 101 by measuring characteristics of the test signal 200 when received by the first node 101. This may also be described as measuring characteristics of the first node 101. Examples of the characteristics may be output power (e.g. EIRP or TRP), frequency error, carrier frequency, occupied bandwidth, and emissions (for example Adjacent Channel Leakage Ratio (ACLR), in band unwanted emissions, spurious emissions). The characteristics may also be RX characteristics such as for example sensitivity, blocking performance, demodulation performance etc.

Step 511

This step corresponds to step 306 in FIG. 3. This step may be performed in addition to step 506 or instead of step 506. Step 507 may be performed before or after step 506 or at the same time as step 506. When the transmitter 105 of the first node 101 should be tested, the first node 101 receives, from the second node 103, measurement data indicating measured characteristics of test signal 200 which has been received and measured by the second node 103.

Step 512

The first node 101 may receive, from the second node 103 or another node, instructions to stop transmitting the test signal 200. The other node may be for example a controlling node.

Figure 7:
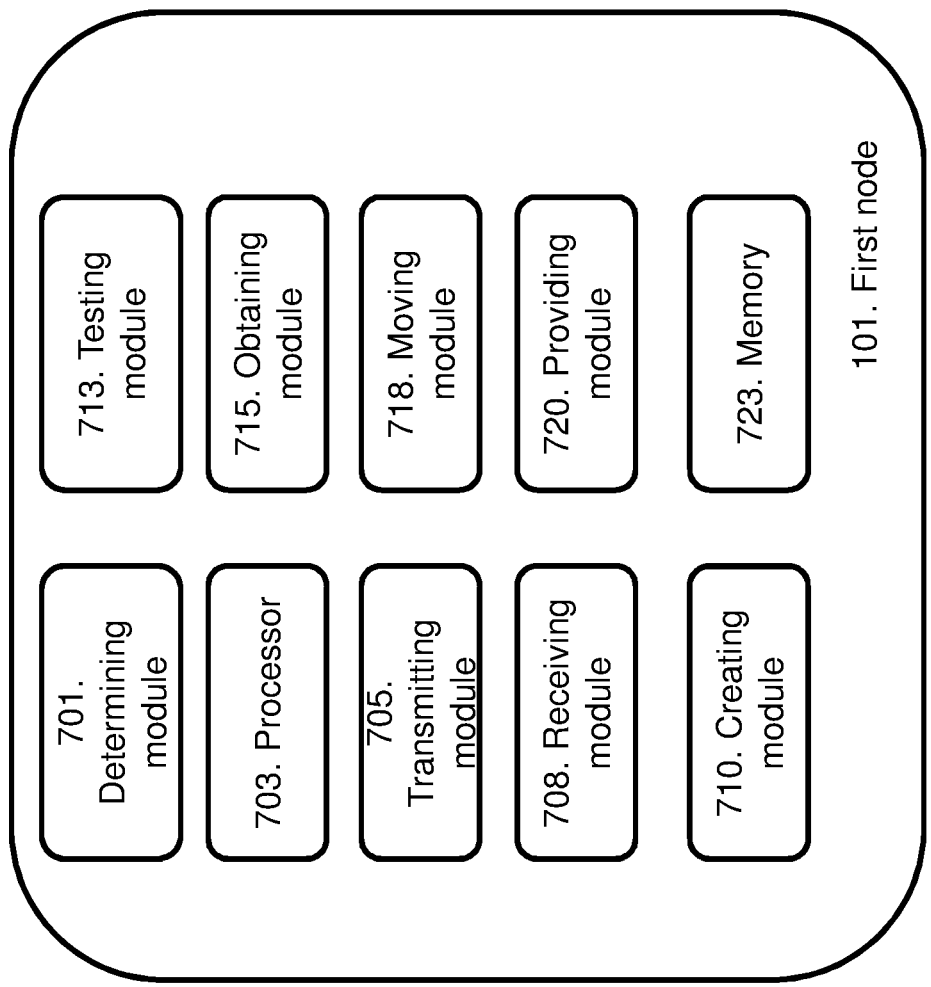
FIG. 7 is a schematic drawing illustrating a first node.

To perform the method steps shown in FIGS. 3, 4 and 5 for enabling testing of at least a part 105, 108 of the first node 101 in a deployed network, the first node 101 may comprise an arrangement as shown in FIG. 7. The first node 101 may be a base station and the second node 103 may be a UE, and a transmitter 105 of the first node 101 may be the part that should be tested. The first node 101 may be a base station and the second node 103 may be a UE, and a receiver 108 of the first node 101 may be the part that should be tested.

The first node 101 is adapted to, e.g. by means of a determining module 701, determine that at least a part 105, 108 of the first node 101 should be tested. The determining module 701 may also be referred to as a determining unit, a determining means, a determining circuit, means for determining etc. The determining module 701 may be a processor 703 of the first node 101 or comprised in the processor 703 of the first node 101.

The first node 101 is adapted to, e.g. by means of the determining module 701, determine a direction in which to transmit or receive a test signal 200 to or from a second node 103. The direction may be determined based on the second node's position. The direction may be determined by receiving direction information indicating the direction from the second node 103.

The first node 101 is adapted to, e.g. by means of a transmitting module 705, transmit the test signal 200 OTA in the determined direction to the second node 103 if a transmitter of the first node 101 should be tested. The transmitting module 705 may also be referred to as a transmitting unit, a transmitting means, a transmitting circuit, means for transmitting, output unit etc. The transmitting module 705 may be a transmitter, a transceiver etc. The transmitting module 705 may be a wireless transmitter of the first node 101 of a wireless or fixed communications system.

The first node 101 is adapted to, e.g. by means of a receiving module 708, receive the test signal 200 OTA in the determined direction from the second node 103 if a receiver of the first node 101 should be tested. The receiving module 708 may also be referred to as a receiving unit, a receiving means, a receiving circuit, means for receiving, input unit etc. The receiving module 708 may be a receiver, a transceiver etc. The receiving module 708 may be a wireless receiver of the first node 101 of a wireless or fixed communications system.

The first node 101 may be being further adapted to, e.g. by means of the receiving module 708, receive a request for testing from the second node 103 or from another node. The other node may be for example a controlling node.

The first node 101 may be further adapted to, e.g. by means of a creating module 710, create the test signal 200. The creating module 710 may also be referred to as a creating unit, a creating means, a creating circuit, means for creating etc. The creating module 710 may be the processor 703 of the first node 101 or comprised in the processor 703 of the first node 101. As mentioned earlier, the test signal 200 may comprise buffered data and test data in resource blocks. The buffered data may be scheduled in at least one resource block 601 and the test data may be scheduled in at least other resource block 605 which is not used by the buffered data 601.

The first node 101 may be further adapted to, e.g. by means of a testing module 713, test the receiver 108 of the first node 101 by measuring characteristics of the test signal 200 when received by the first node 101. The test may be performed when the receiver 108 of the first node 101 should be tested. The testing module 713 may also be referred to as a testing unit, a testing means, a testing circuit, means for testing etc. The testing module 713 may be the processor 703 of the first node 101 or comprised in the processor 703 of the first node 101.

The first node 101 may be further adapted to, e.g. by means of the receiving module 708, receive, from the second node 103, measurement data indicating measured characteristics of test signal 200 which has been received and measured by the second node 103. The measurement data may be received when the transmitter 105 of the first node 101 should be tested.

The first node 101 may be further adapted to, e.g. by means of an obtaining module 715, obtain second node position information indicating the second node's position with respect to the first node 101. The second node's position 101 may be a current position or a future position. The obtaining module 715 may also be referred to as an obtaining unit, an obtaining means, an obtaining circuit, means for obtaining etc. The obtaining module 715 may be the processor 703 of the first node 101 or comprised in the processor 703 of the first node 101. In some examples the obtaining module is the same as the receiving module 708.

The first node 101 may be further adapted to, e.g. by means of the determining module 701, determine a position in which the first node 101 should be located when transmitting or receiving the test signal 200.

The first node 101 may be further adapted to, e.g. by means of a moving module 718, move to the determined position if it is different from a current position of the first node 101. The moving module 718 may also be referred to as a moving unit, a moving means, a moving circuit, means for moving etc. The moving module 718 may be the processor 703 of the first node 101 or comprised in the processor 703 of the first node 101.

The first node 101 may be further adapted to, e.g. by means of a providing module 720, provide, to the second node 103, first node position information indicating the first node's position with respect to the second node 103. The providing module 720 may also be referred to as a providing unit, a providing means, a providing circuit, means for providing etc. The providing module 720 may be the processor 703 of the first node 101 or comprised in the processor 703 of the first node 101. The providing module 720 may be the same as the transmitting module 705.

The first node 101 may be further adapted to, e.g. by means of the receiving module 708, receive, from the second node 103 or another node, instructions to stop transmitting the test signal 200. The other node may be for example a controlling node.

In some examples, the first node 101 comprises a memory 723. The memory 723 comprises instructions executable by the processor 703. The memory 723 comprises one or more memory units. The memory 723 is arranged to be used to store data, received data streams, power level measurements, threshold values, direction information, measurement data, position information, test signal 200, requests, responses, buffered data, test data, measured characteristics, instructions, time periods, configurations, schedulings, and applications to perform the methods herein when being executed in the first node 101.

Those skilled in the art will also appreciate that the determining module 701, the transmitting module 705, the receiving module 708, the creating module 710, the testing module 713, the obtaining module 715, the moving module 718 and the providing module 720 described above may refer to a combination of analog and digital circuits, and/or one or more processors configured with software and/or firmware, e.g. stored in a memory, that when executed by the one or more processors such as the processor 703 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A first computer program may comprise instructions which, when executed on at least one processor, cause the at least one processor to carry out the method according to any at least one step of the methods illustrated in FIGS. 3, 4 and/or 5. A first carrier may comprise the first computer program, and the first carrier may be one of an electronic signal, optical signal, radio signal or computer readable storage medium.

Figure 8:
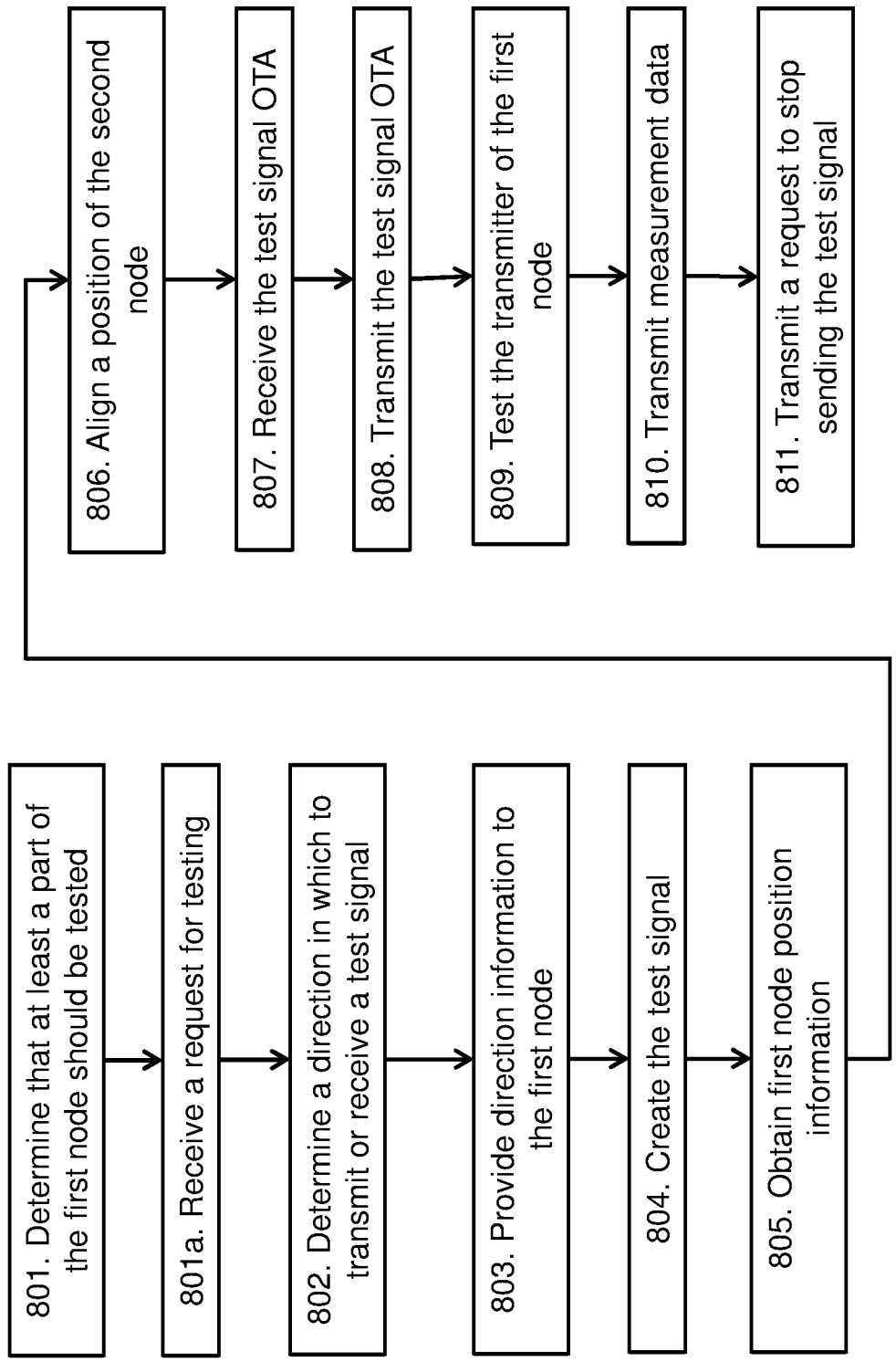
FIG. 8 is a flow chart illustrating a method performed by a second node.

The method described above will now be described seen from the perspective of the second node 103. FIG. 8 is a flowchart describing the present method in the second node 103 for enabling testing of at least a part 105, 108 of the first node 101 in a deployed network. The first node 101 may be a base station and the second node 101 may be a UE, and a transmitter 105 of the first node 101 may be the part that should be tested. The first node 101 may be a base station, and the second node 103 may be a UE, and a receiver 108 of the first node 101 is the part that should be tested. The method comprises at least one of the following steps to be performed by the second node 103, which steps may be performed in any suitable order than described below:

Step 801

This step corresponds to step 301 in FIG. 3 and step 401 in FIG. 4. The second node 103 determines that at least a part 105, 108 of the first node 101 should be tested.

Step 801*a*

This step corresponds to step 301 in FIG. 3 and step 401 in FIG. 4. This step may be seen as a substep of step 801. The second node 103 may receive a request for testing from the first node 101 or from another node. The other node may be for example a controlling node.

Step 802

This step corresponds to step 302 in FIG. 3 and step 402 in FIG. 4. The second node 103 determines a direction in which to transmit or receive a test signal 200 to or from the first node 101.

Step 803

The second node 103 may provide direction information indicating the direction (which was determined in step 802) to the first node 101.

Step 804

This step corresponds to step 403 in FIG. 4. The second node 103 may create the test signal 200.

The test signal 200 may comprise buffered data and test data in resource blocks, as illustrated in FIG. 6 and described earlier. The buffered data may be scheduled in at least one resource block 601 and the test data may be scheduled in at least other resource block 605 which is not used by the buffered data.

Step 805

The second node 103 may obtain first node position information indicating the first node's position. The position of the first node 101 may be obtained by detecting a reference point at the first node 101 or by receiving first node position information from the first node 101.

Step 806

The second node 103 may align its position in accordance with the determined direction. Using other words, the second node 103 moves to a position which it should be located when transmitting or receiving the test signal 200 if it is different from a current position of the second node 103.

The second node 103 may be located at a first position when receiving a first test signal 200 and at a second position when receiving a second test signal 200. Thus, the second node 103 may move from the first position to the second position before receiving the second test signal 200. The position of the second node 103 may be changed in order to perform the test at different locations. Testing at different location is an advantage since then the spatial aspect of radiation also can be captured, e.g. radiation power patterns of the tested part of the first node 101.

The test signal 200 can be sent to the first node 101 (e.g. a network node) to perform beam steering or beam switching whilst the second node 103 (e.g. the test node) may be stationary as the new beam (the beam may represent the test signal 200) approaches and reconfigures to the second node 103 to test for i.e. beam steering/switching requirements.

Step 807

This step corresponds to step 304 in FIG. 3. The second node 103 receives the test signal 200 OTA in the determined direction from the first node 101 if a transmitter 105 of the first node 101 is the part that should be tested. The test signal 200 may be received in the direction of the first node's position (which was obtained in step 805).

Step 808

This step corresponds to step 404 in FIG. 4. The second node 103 transmits the test signal 200 OTA in the direction to the first node 101 if a receiver 108 of the first node 101 is the part should be tested. The test signal 200 may be transmitted until a timer expires.

Step 809

This step corresponds to step 305 in FIG. 3. When the transmitter 105 of the first node 101 should be tested, the first node 101 may test the transmitter 105 of the first node 101 by measuring characteristics of the test signal 200 when received by the second node 103. This may also be described as the second node 103 measuring characteristics of the first node 101.

Step 810

This step corresponds to step 306 in FIG. 3. The second node 103 may transmit measurement data indicating the measured characteristics (measured in step 809) to the first node 101.

Step 811

When the transmitter of the first node 101 should be tested, the second node 103 may transmit, to the first node 101, a request to stop sending the test signal 200. The request may be to immediately stop sending the test signal 200 or to stop sending the test signal 200 at a certain time.

Figure 9:
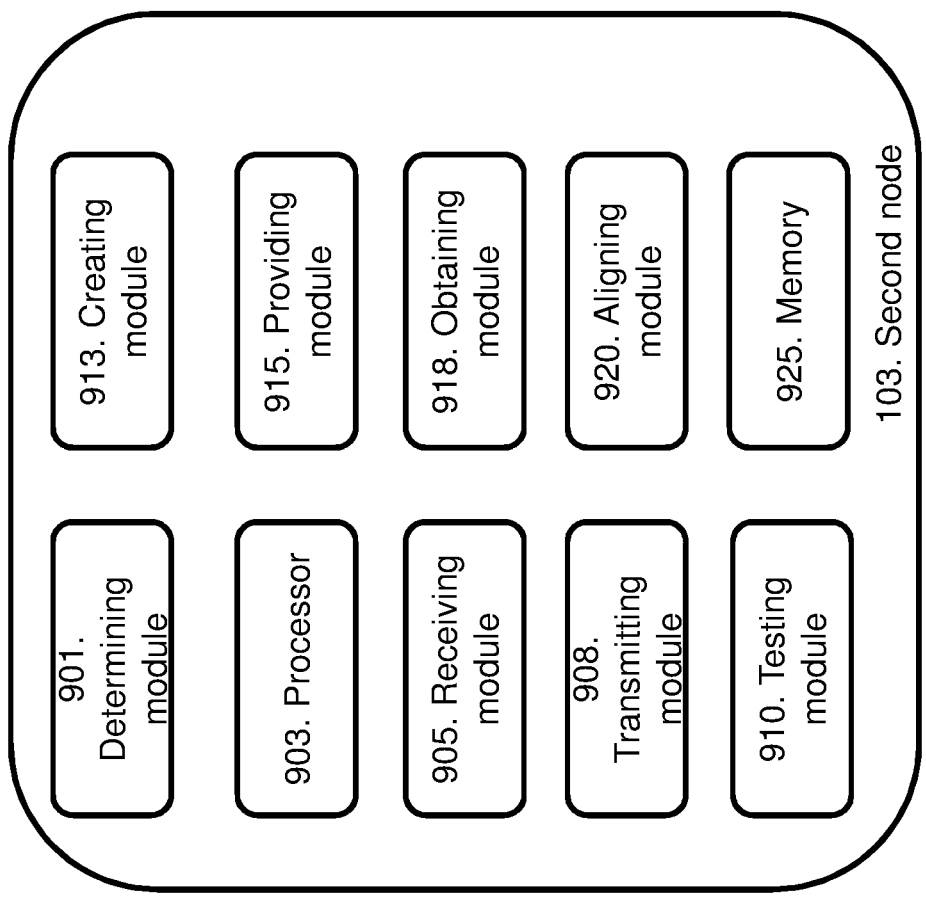
FIG. 9 is a schematic drawing illustrating a second node.

To perform the method steps shown in FIGS. 3, 4 and 8 for enabling testing of at least a part 105, 108 of the first node 101 in a deployed network, the second node 103 may comprise an arrangement as shown in FIG. 9. The first node 101 may be a base station and the second node 103 may be a UE, and a transmitter 105 of the first node 101 may be the part that should be tested. The first node 101 may be a base station and the second node 103 may be a UE, and a receiver 108 of the first node 101 may be the part that should be tested.

The second node 103 may be adapted to, e.g. by means of a determining module 901, determine that at least a part 105, 108 of the first node 101 should be tested. The determining module 901 may also be referred to as a determining unit, determining means, a determining circuit, means for determining etc. The determining module 901 may be a processor 903 of the second node 103 or comprised in the processor 903 of the second node 103.

The second node 103 may be adapted to, e.g. by means of the determining module 901, determining a direction in which to transmit or receive a test signal 200 to or from the first node 101.

The second node 103 may be adapted to, e.g. by means of a receiving module 905, receive the test signal 200 OTA, in the direction from the first node 101 if a transmitter 105 of the first node 101 is the part that should be tested. The receiving module 905 may also be referred to as a receiving unit, a receiving means, a receiving circuit, means for receiving, input unit etc. The receiving module 905 may be a receiver, a transceiver etc. The receiving module 905 may be a wireless receiver of the second node 103 of a wireless or fixed communications system. The test signal 200 may be received in the direction of the first node's position. The second node 103 may be located at a first position when receiving a first test signal 200 and at a second position when receiving a second test signal 200.

The second node 103 may be adapted to, e.g. by means of a transmitting module 908, transmit the test signal 200 OTA in the direction to the first node 101 if a receiver 108 of the first node 101 is the part should be tested. The transmitting module 908 may also be referred to as a transmitting unit, a transmitting means, a transmitting circuit, means for transmitting, output unit etc. The transmitting module 908 may be a transmitter, a transceiver etc. The transmitting module 908 may be a wireless transmitter of the second node 103 of a wireless or fixed communications system.

The second node 103 may be further adapted to, e.g. by means of a testing module 910, test the transmitter 105 of the first node 101 by measuring characteristics of the test signal 200 when received by the second node 103. The testing may be done when the transmitter 105 of the first node 101 should be tested. The testing module 910 may also be referred to as a testing unit, testing means, a testing circuit, means for testing etc. The testing module 910 may be the processor 903 of the second node 103 or comprised in the processor 903 of the second node 103.

The second node 103 may be further adapted to, e.g. by means of the transmitting module 908, transmit measurement data indicating the measured characteristics to the first node 101.

The second node 103 may be further adapted to, e.g. by means of the receiving module 905, receive a request for testing from the first node 101 or from another node. The other node may be for example a controlling node.

The second node 103 may be further adapted to, e.g. by means of a creating module 913, create the test signal 200. The creating module 913 may also be referred to as a creating unit, creating means, a creating circuit, means for creating etc. The creating module 913 may be the processor 903 of the second node 103 or comprised in the processor 903 of the second node 103. The test signal 200 may comprise buffered data and test data in resource blocks. The buffered data may be scheduled in at least one resource block 601 and the test data may be scheduled in at least other resource block 605 which is not used by the buffered data.

The second node 103 may be further adapted to, e.g. by means of a providing module 915, provide direction information indicating the direction to the first node 101. The providing module 915 may also be referred to as a providing unit, providing means, a providing circuit, means for providing etc. The providing module 915 may be the processor 903 of the second node 103 or comprised in the processor 903 of the second node 103. The providing module 915 may be the same as the transmitting module 908.

The second node 103 may be further adapted to, e.g. by means of the transmitting module 908 transmit, to the first node 101, a request to stop sending the test signal 200. The request may be transmitted when the transmitter of the first node 101 should be tested.

The second node may be further adapted to, e.g. by means of an obtaining module 918, obtain first node position information indicating the first node's position. The obtaining module 918 may also be referred to as an obtaining unit, an obtaining means, an obtaining circuit, means for obtaining etc. The obtaining module 918 may be the processor 903 of the second node 103 or comprised in the processor 903 of the second node 103. The obtaining module 918 may be the same as the receiving module 905.

The position of the first node 101 may be obtained by detecting a reference point at the first node 101 or by receiving first node position information from the first node 101.

The second node 103 may be further adapted to, e.g. by means of an aligning module 920, align a position of the second node 103 in accordance with the determined direction. The aligning module 920 may also be referred to as an aligning unit, an aligning means, an aligning circuit, means for aligning etc. The aligning module 920 may be the processor 903 of the second node 103 or comprised in the processor 903 of the second node 103.

In some examples, the second node 103 comprises a memory 925. The memory 925 comprises instructions executable by the processor 903. The memory 925 comprises one or more memory units. The memory 925 is arranged to be used to store data, received data streams, power level measurements, threshold values, direction information, measurement data, position information, test signal 200, requests, responses, buffered data, test data, measured characteristics, instructions, time periods, configurations, schedulings, and applications to perform the methods herein when being executed in the second node 103.

Those skilled in the art will also appreciate that the determining module 901, the receiving module 905, the transmitting module 908, the testing module 910, the creating module 913, the providing module 915, the obtaining module 918 and the aligning module 920 described above may refer to a combination of analog and digital circuits, and/or one or more processors configured with software and/or firmware, e.g. stored in a memory, that when executed by the one or more processors such as the processor 903 perform as described above. One or more of these processors, as well as the other digital hardware, may be included in a single ASIC, or several processors and various digital hardware may be distributed among several separate components, whether individually packaged or assembled into a SoC.

In some examples, a second computer program may comprise instructions which, when executed on at least one processor, cause the at least one processor to carry out at least one of the method steps in FIGS. 3, 4 and 8. A second carrier may comprise the second computer program, and the second carrier may be one of an electronic signal, optical signal, radio signal or computer readable storage medium.

The present mechanism for enabling testing of at least a part 105, 108 of the first node 101 in a deployed network may be implemented through one or more processors, such as a processor 703 in the first node arrangement depicted in FIG. 7 and a processor 903 in the second node arrangement depicted in FIG. 9, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the first node 101 and the second node 103. One such carrier may be in the form of a CD ROM disc. It is however feasible with other data carriers such as a memory stick. The computer program code can furthermore be provided as pure program code on a server and downloaded to at least one of the first node 101 and the second node 103.

The embodiments herein, aiming at removing the need for connector based monitoring ports, may be based on at least one of the following components:

Standardized or proprietary signaling that allows emulation of a fully loaded cell to be initiated, where the signaling may comprise at least one of the following:
Signaling terminated by the first node 101 via the core network that enables or disables emulation of fully loaded cell.
Signaling terminated by the first node 101 via the core network that enables emulation of fully loaded cell, and where disabling is based e.g. on expiration of a timer,
Signaling terminated by the first node 101 via the access network that enables or disables emulation of fully loaded cell,
Signaling terminated by the first node 101 via the access network that enables emulation of fully loaded cell, and where disabling is based e.g. on expiration of a timer.
Means for the second node 103 (e.g. a wireless communication device that is envisaged for measurement, not just a standard UE) to request emulation of fully loaded cell.
Means for a the second node 103 (e.g. a wireless communication device) to conduct AAS compliance-related measurements,
Means for the second node 103 (e.g. the wireless communication device) to establish the orientation with respect to the first node 101 (e.g. the base station radiation aperture).

If periodic measured points are evaluated within an acceptable margin of error, then the overall Total Radiated Power (TRP) can be assumed to be equivalent to a first measurement during controlled environment. The TRP is the total radiated signal over all angles around the sphere. The TRP can be approximated by measuring Effective radiated power (EIRP) at a few spatial points around the second node 103 (e.g. the test object). Strictly, the TRP is the continuous integral of radiation power intensity over the full area of a sphere. In other words, to obtain a power measurement equivalent to the measurement from a connector, so called TRP needs to be measured. TRP is measured by means of making measurements at a plurality of points around the first node 101 (e.g. the base station).

Figure 10:
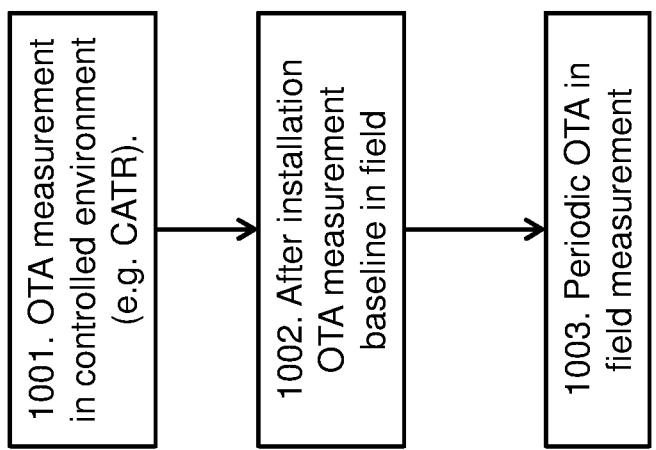
FIG. 10 is a flow chart illustrating a method.

To enable checking of the radiated output power, periodic measurements need to be made in the far-field region. A baseline measurement needs to be made in a controlled environment so that any relative difference in power when measured at a later stage can be detected by means of comparison to this reference, as depicted in FIG. 10. The method in FIG. 10 comprises at least one of the following steps, which steps may as well be carried out in another suitable order than described below:

Step 1001

An OTA measurement in a controlled environment (e.g. a Compact Antenna Test Range (CATR)) is performed.

Step 1002

This corresponds to step 305 in FIG. 3, step 405 in FIG. 4, step 510 in FIG. 5 and step 809 in FIG. 8. This may also be seen as corresponding to the whole of FIGS. 3, 4, 5 and 8. An after installation OTA baseline measurement in the field is performed.

Step 1003

This corresponds to step 305 in FIG. 3, step 405 in FIG. 4, step 510 in FIG. 5 and step 809 in FIG. 8. This may also be seen as corresponding to the whole of FIGS. 3, 4, 5 and 8. A periodic OTA in field measurement is performed.

Cell Load

A fully loaded cell can be achieved by identifying the physical resources that are not needed for scheduling of active second nodes 103 (e.g. UEs), and fill those resources with dummy data. Note that dummy data is the same as the test data. In LTE, such dummy data is called Orthogonal frequency-division multiplexing (OFDM) channel noise generator (OCNG) and is used for conformance testing of second nodes 103 (e.g. UEs) (see for instance U.S. Pat. No. 8,411,553). The effect is that the whole downlink system bandwidth is utilized, whereby fluctuations due to varying load conditions can be ruled out. It shall be noted that in LTE there may be a difference in received power level on the second node side by up to 12.5 dB between the extremes empty or fully loaded cell. Such fluctuations need to be taken into account e.g. in automatic gain control and also in the representation of radio samples in the second node 103 (number of bits used). For AAS compliance-related measurements it is however essential that uncertainty due to load conditions can be eliminated.

When configured to emulate a fully loaded cell, the first node 101 (e.g. the base station scheduler) may carry out at least one of the following steps:

1) Schedule active second nodes 103 (e.g. UEs).
2) Identify unused scheduling resources.
3) Fill unused scheduling resources with dummy data (e.g. Quadrature phase shift keying (QPSK)).

Signaling

In some examples, the signaling by the second node 103 (e.g. the wireless communication measurement device) may for instance comprise at least one of the following:

Transmitting particular predetermined sequences over a Random Access Channel (RACH) to the first node 101.

Transmitting particular predetermined sequences of Channel Quality Indicator (CQI) values over a Physical Uplink Control Channel (PUCCH) and a Physical Downlink Shared Channel (PDSCH) to the first node 101.

Transmitting particular bit patterns over PDSCH.

In one example, the signaling by the second node 103 (e.g. the wireless communication measurement device) may for instance comprise at least one of the following:

An indicator bit being set on PUCCH.

A Radio Resource Control (RRC) message for requesting full load conditions.

The steps taken by the second node 103 (e.g. an application on the wireless communication measurement device) may comprise at least one of the following:

To determine that a measurement (i.e. a test) is to be carried out.

To request the first node 101 to emulate full load.

To carry out a measurement.

To request the first node 101 to turn off full load emulation (optional step).

Thus, the embodiments herein provide an alternative to using measurement/monitoring ports.

Some embodiments described herein may be summarised in the following manner:

The first node 101 may be capable of at least one of the following:

Receiving and decoding a request on emulating a fully loaded cell, emulating a fully loaded cell by adding dummy data to unused resources (Orthogonal Channel Noise Simulator (OCNS), Orthogonal Channel Noise Generator (OCNG), etc.).

Scheduling buffered data to connected second nodes 103 (e.g. UE), and scheduling dummy data in otherwise unused resources, if any.

Transmitting the scheduled data on the downlink to the second node 103.

To support an accurate measurement, the antenna aperture of the first node 101 may be equipped with a physical reference point. This physical reference point is detectable by the second nod 103 and may be used in order to align the positions of the nodes 101, 103 with respect to each other.

The second node 103 may e.g. be a wireless communication device comprised in an Unmanned Aerial Vehicle (UAV). The UAV may be, in addition to the second node 103, equipped with an Inertial Navigation System (INS) and a Global Navigation Satellite Systems (GNSS) receiver. The second node 103 may be capable of at least one of the following:

Finding a pre-defined location (e.g. longitude, latitude and/or altitude) with respect to test object (i.e. the part of the first node 101 to be tested), Measuring the desirable metrics (transmitted power, carrier frequency, etc.) or buffer and retransmitting I/O samples for processing at ground (i.e. at the first node 101). Using other words, measuring, on the downlink, one or more characteristics of the transmitting node.

Transmitting, via signalling, a request on activating emulation of full cell load to the first node 101.

Detecting the antenna aperture mechanical bore-sight with of the test object.

The examples herein relate to nodes 101, 103 and methods for making OTA measurements of output power (and possibly other characteristics) for deployed first nodes 101 (e.g. base stations) consisting of a first node 101 with significant markings enabling a spatial orientation of a second node 103 and procedures for activating and making directional measurements both in a controlled environment and in real operation.

The examples herein are based on the possibility to enable spatial measurement of power for a fully loaded carrier. Spatial measurements require knowledge about the location of the first node 101 (e.g. the measurement antenna of the base station) with respect to the second node 103 (e.g. the test object). The position of the second node 103 (e.g. the measurement device which may be e.g. mounted onboard an UAV) needs to be known with an accuracy larger than what is achieved by an unassisted GNSS. Together, with methods for assisted GNSS and means of aligning the location of the first node 101 with respect to the RX 110 of the second node 103 (e.g. the radiating aperture of the test object), the radiated power could be determined.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements. The terms "consisting of" or "consisting essentially of" may be used instead of the term comprising.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method for testing a first node, the method comprising:
the first node receiving a request for emulating a fully loaded cell;
as a result of receiving the request, the first node making a decision that (i) a transmitter of the first node should be tested or (ii) a receiver of the first node should be tested;
obtaining test subject information, wherein the test subject information indicates i) that the transmitter of the first node should be tested and/or ii) that the receiver of the first node should be tested;
obtaining position information indicating a position of a second node with respect to a position of the first node;
before transmitting or receiving a test signal, determining a direction in which to transmit the test signal or to receive the test signal based on the obtained position information;
(i) if the test subject information indicates that the transmitter of the first node should be tested:
the first node transmitting the test signal, over the air (OTA), in the indicated direction;
the first node receiving measurement data transmitted by the second node that received and measured the transmitted test signal, wherein the measurement data transmitted by the second node indicates a characteristic of the received test signal received by the second node; and
the first node comparing the received measurement data transmitted by the second node to data indicating a determined characteristic of the transmitted test signal transmitted by the first node; and
(ii) if the test subject information indicates that the receiver of the first node should be tested:
the first node receiving, OTA, in the indicated direction, the test signal transmitted by the second node; and
the first node transmitting to the second node measurement data indicating a characteristic of the received test signal received by the first node, wherein the second node is configured to compare the received measurement data transmitted by the first node to data indicating a determined characteristic of the transmitted test signal transmitted by the second node.

2. The method of claim 1, wherein
the test signal comprises buffered data and test data in resource blocks,
the buffered data is scheduled in at least one resource block, and
the test data is scheduled in at least other resource block which is not used by the buffered data.

3. The method of claim 1, further comprising:
determining a position in which the first node should be located when transmitting or receiving the test signal; and
moving the first node to the determined position after determining that the determined position is different from a current position of the first node.

4. The method of claim 1, wherein the first node is a base station and the second node is a user equipment.

5. A method for testing a first node, the method comprising:
obtaining test subject information, wherein the test subject information indicates i) that a transmitter of the first node should be tested and/or ii) that a receiver of the first node should be tested;
obtaining position information indicating a position of a second node with respect to a position of the first node;
before transmitting or receiving a test signal, determining a direction in which to transmit the test signal or to receive the test signal based on the obtained position information;
(i) if the test subject information indicates that the transmitter of the first node should be tested:
the second node receiving, over the air (OTA), in the indicated direction, the test signal transmitted by the first node; and
the second node transmitting to the first node measurement data indicating a characteristic of the received test signal received by the second node,
wherein the first node is configured to compare the received measurement data transmitted by the second node to data indicating a determined characteristic of the transmitted test signal transmitted by the first node; and
(ii) if the test subject information indicates that the receiver of the first node should be tested:
the second node transmitting to the first node the test signal, OTA, in the indicated direction;
the second node receiving measurement data transmitted by the first node that received and measured the transmitted test signal, wherein the measurement data transmitted by the first node indicates a characteristic of the received test signal received by the first node; and
the second node comparing the received measurement data transmitted by the first node to data indicating a determined characteristic of the transmitted test signal transmitted by the second node, wherein
the first node is configured to receive a request for emulating a fully loaded cell, and
as a result of receiving the request, the first node is configured to make a decision that (i) the transmitter of the first node should be tested or (ii) the receiver of the first node should be tested.

6. The method of claim 5, wherein
the test signal comprises buffered data and test data in resource blocks,
the buffered data is scheduled in at least one resource block, and
the test data is scheduled in at least other resource block which is not used by the buffered data.

7. The method of claim 5, further comprising:
transmitting, to the first node, a request to stop transmitting the test signal.

8. The method of claim 5, further comprising:
obtaining first node position information indicating the first node's position, and wherein the test signal is received in the direction of the first node's position.

9. The method of claim 5, wherein the first node is a base station and the second node is a user equipment.

10. A first node, the first node being adapted to:
receive a request for emulating a fully loaded cell;
as a result of receiving the request, make a decision that (i) a transmitter of the first node should be tested or (ii) a receiver of the first node should be tested;
obtain test subject information, wherein the test subject information indicates i) that the transmitter of the first node should be tested and/or ii) that the receiver of the first node should be tested;
obtain position information indicating a position of a second node with respect to a position of the first node;
before transmitting or receiving a test signal, determine a direction in which to transmit the test signal or to receive the test signal based on the obtained position information;
(i) if the test subject information indicates that the transmitter of the first node should be tested:
the first node transmitting the test signal over the air (OTA) in the indicated direction;
the first node receiving measurement data transmitted by the second node that received and measured the transmitted test signal, wherein the measurement data transmitted by the second node indicates a characteristic of the received test signal received by the second node; and
the first node comparing the received measurement data transmitted by the second node to data indicating a determined characteristic of the transmitted test signal transmitted by the first node; and
(ii) if the test subject information indicates that the receiver of the first node should be tested;
the first node receiving, OTA in the indicated direction, the test signal transmitted by the second node; and
the first node transmitting to the second node measurement data indicating a characteristic of the received test signal received by the first node, wherein the second node is configured to compare the received measurement data transmitted by the first node to data indicating a determined characteristic of the transmitted test signal transmitted by the second node.

11. The first node of claim 10, wherein
the test signal comprises buffered data and test data in resource blocks,
the buffered data are scheduled in at least one resource block, and
the test data is scheduled in at least other resource block which is not used by the buffered data.

12. The first node of claim 10, being further adapted to:
obtain second node position information indicating the second node's position with respect to the first node, wherein
the second node's position is a current position or a future position; and
the direction information is determined based on the second node's position.

13. The first node of claim 10, being further adapted to:
determine a position in which the first node should be located when transmitting or receiving the test signal; and
move the first node to the determined position after determining that the determined position is different from a current position of the first node.

14. The first node of claim 10, wherein the first node is a base station and the second node is a user equipment.

15. A second node, the second node being adapted to:
obtain test subject information, wherein the test subject information indicates i) that a transmitter of the first node should be tested and/or ii) that a receiver of the first node should be tested;
obtain position information indicating a position of a second node with respect to a position of the first node;
before transmitting or receiving a test signal, determine a direction in which to transmit the test signal or to receive the test signal based on the obtained position information;
(i) if the test subject information indicates that the transmitter of the first node should be tested:
the second node receiving, over the air (OTA) in the indicated direction, the test signal transmitted by the first node; and
the second node transmitting to the first node measurement data indicating a characteristic of the received test signal received by the second node,
wherein the first node is configured to compare the received measurement data transmitted by the second node to data indicating a determined characteristic of the transmitted test signal transmitted by the first node; and
(ii) if the test subject information indicates that the receiver of the first node should be tested:
the second node transmitting to the first node the test signal OTA in the indicated direction;
the second node receiving measurement data transmitted by the first node that received and measured the transmitted test signal, wherein the measurement data transmitted by the first node indicates a characteristic of the received test signal received by the first node; and
the second node comparing the received measurement data transmitted by the first node to data indicating a determined characteristic of the transmitted test signal transmitted by the second node, wherein
the first node is configured to receive a request for emulating a fully loaded cell, and
as a result of receiving the request, the first node is configured to make a decision that (i) the transmitter of the first node should be tested or (ii) the receiver of the first node should be tested.

16. The second node of claim 15, wherein
the test signal comprises buffered data and test data in resource blocks,
the buffered data is scheduled in at least one resource block, and
the test data is scheduled in at least other resource block which is not used by the buffered data.

17. The second node of claim 15, being further adapted to:
when the transmitter of the first node should be tested, transmit, to the first node, a request to stop sending the test signal.

18. The second node of claim 15, wherein a position of the first node is obtained by detecting a reference point at the first node or by receiving first node position information from the first node.

19. The second node of claim 15, wherein the first node is a base station and the second node is user equipment.

20. The method of claim 1, the method further comprising:
   after the first node making the decision, the first node transmitting the decision toward the second node or a third node.

* * * * *